3,529,000
C-21 HYDROXYLATION PRODUCTS OF STEROIDS
Brian Gadsby, Maidenhead, England, and George Greenspan, Narberth, Pa., assignors to American Home Products Corporation, New York, N.Y., a corporation of Delaware
No Drawing. Filed Jan. 29, 1968, Ser. No. 701,086
Int. Cl. C07c *169/32, 169/34*
U.S. Cl. 260—397.45                        4 Claims

ABSTRACT OF THE DISCLOSURE

The invention is directed to dl-13β-alkyl-21-hydroxy-18-19-dinorpregn-4-ene-3,20-diones which have either a hydrogen, oxo, α-hydroxy or β-hydroxy group in the 11-position. The compounds are useful as intermediates in the production of 18-homo-19-norcortisone and 18-homo-19-norhydrocortisone, which are useful as anti-inflammatory compounds.

---

This invention relates to new C-21-hydroxylated steroids produced by a micro-biological process. More particularly, the invention is directed to dl-13β-alkyl-21-hydroxy-18,19-dinorpregn-4-ene-3,20-diones which have either a hydrogen, oxo, α-hydroxy or β-hydroxy group in the 11-position. The new compounds of the present invention are useful as intermediates in the preparation of 18-homo-19-norcortisone and 18-homo-19-norhydrocortisone which are members of a class known to be useful as anti-inflammatory compounds.

The new steroids of the present invention considered in their broadest aspect include those encompassed within Formula I below:

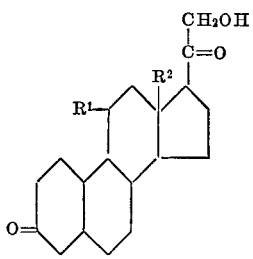

where $R^1$ is a member selected from the class consisting of hydrogen, oxo, α-hydroxy and β-hydroxy; and $R^2$ is an alkyl group having from 1 to 3 carbons.

The preparation of compound I is accomplished by the use of a selected microbial organism to hydroxylate the corresponding 21-methyl compounds. The genus Aspergillus has been found useful for this purpose with the species *Aspergillus niger* being preferred. More specifically, it has been found that *A. niger* NRRL 599 is uniquely adapted to effect the C-21 hydroxylation. The microorganism is obtainable from known sources, such as the Northern Regional Research Laboratories, Peoria, Ill.

A typical fermentation of a specific compound to the 21-hydroxy steroid of the present invention is exemplified below:

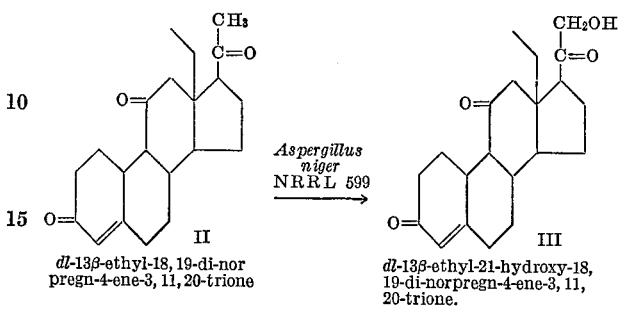

dl-13β-ethyl-18,19-di-nor pregn-4-ene-3,11,20-trione dl-13β-ethyl-21-hydroxy-18, 19-di-norpregn-4-ene-3,11, 20-trione.

The starting materials as illustrated in Formula II above utilized in preparaing new compounds of the present invention may be prepared according to the method described in pending application Ser. No. 602,785 filed Dec. 19, 1966, and now abandoned, particularly Example 65 thereof.

It is to be understood that either the dl steroids or specific d or l isomers may be employed as starting materials with like results.

In carrying out the process of the present invention, aerobic conditions are maintained in the presence of a suitable nutrient medium at a temperature in the range of from about 15° C. to about 37° C. in the presence of the fungal species referred to. The reaction to prepare a given quantity of a 21-hydroxylated compound is normally complete within a period of from within a few hours to about 80 hours. During the growth of the organism under suitable conditions in the presence of a steroid having a methyl at the C-21-position, hydroxylation takes place in that position.

*A. niger* NRRL 599 can be grown on a dextrose, peptone, corn steep liquor medium at a temperature of about 28° C. for a period of about 66 hours. Suitable nutrient media which may also be used include a yeast extract-dextrose medium or a malt extract-yeast extract-dextrose medium. Other suitable media which contain the necessary carbon, nitrogen, and mineral elements, in the form of carbon include sugars such as glucose, sucrose, maltose, xylose, galactose and so forth; alcohols such as glycerol or mannitol; organic acids such as citric acid, maleic acid, acetic acid and various other natural products containing carbohydrates such as corn starch, corn steep liquor, soya bean meal, cotton seed meal and many available materials which have been described heretofore as a source of carbon in steroid fermentation processes. Usually a variety of carbon sources can be employed in the medium with good results. Suitable sources of nitrogen include a number of the above named materials such as corn steep liquor, soya bean meal, cotton seed meal and various substances such as beef extract, casein, yeast, enzymatically digested proteins, degradation products including peptones, amino acids and many other available proteinaceous materials which have been found to be suitable in supporting the growth of fungi. Inorganic sources of nitrogen include ammonium salts and nitrates which may also be used in the medium as a source of nitrogen to provide a favorable growth medium for the organism.

The mineral requirements of fermentation are usually supplied in the crude materials which are often used as sources of carbon and nitrogen or water that is used in the process. However, it may be advisable to supplement the minerals normally present with added amounts to obtain maximum growth. Cations and anions which may be desirable in added amounts include sodium, potassium, calcium, magnesium, phosphate, sulfate, chloride, cobalt, manganese and various others. The use of elements such as boron, copper, cobalt, molybdenum and chromium is often desirable.

The growth of the organism takes place under aerobic conditions, and aeration in flasks, for example, can be achieved by agitation on a reciprocating or rotary shaker or in bottles or tanks by forcing sterile air through the fermentation mixture. It is desirable that the sterile air be forced through the medium in an amount of from ½ to 2 volumes of air per volume of medium per minute. Agitation in the bottles or fermenter tanks is provided by mechanical impeller. It is preferable to carry out the process of the present invention at a temperature within the range of about 15° C. to about 37° C.

To obtain large working quantities of the culture $A.$ $niger$ NRRL 599, the following method may be used. Seven flasks of a corn steep liquor-peptone-dextrose medium, 100 ml. in 500 ml. flasks, are inoculated with a spore suspension prepared from agar slant growth of $A.$ $niger$ NRRL 599. The flasks are incubated at about 23 to 30° C. on a rotary shaker 250 r.p.m., 2″ diameter of rotation, for about 48 to 72 hours. Ten percent transfers are then made to 12 2-liter flasks, each with 400 ml. of the same medium.

After the growth of the microorganism has taken place to some extent, the steroids are added to the fermentation in solution or finely divided form. One of the preferred methods is to dissolve the steroid in methanol or other water-miscible solvents and add it to the fermentation medium at the desired stage in the process. Although the steroid may precipitate from solution when so added, it is dispersed through the medium as a fine suspension and becomes readily available to the organism for hydroxylation. The amount of steroid added to the fermentation medium may vary considerably but is generally about 1/10 to 1 gram per liter of medium.

During the fermentation process, it may be desirable to add anti-foaming agents such as silicones and glyceride oils. These compounds are added from time to time as needed. The fermentation is allowed to proceed for a period of time long enough to achieve maximum conversion of the steroid to the 21-hydroxylated product.

When maximum conversion to the 21-hydroxylated product is obtained, the desired 21-hydroxylated steroid is recovered from the fermentation by extracting with ethyl acetate. The product obtained by fermentation with $A.$ $niger$ is extracted a number of times such as for example 3 times or more with ethyl acetate and the combined extracts evaporated under vacuum.

In order more clearly to disclose the nature of the present invention, specific examples of the practice of the invention are hereinafter given. It should be understood, however, that this is done solely by way of example, and is intended neither to delineate the scope of the invention nor to limit the ambit of the appended claims.

EXAMPLE I

The preparation of $dl$-13β-ethyl-21-hydroxy-18,19-dinorpregn-4-ene-3,11,20-trione may be accomplished as follows: An agar slant of $Aspergillus\ niger$ NRRL 599 is washed with 6 milliliters (ml.) of distilled water, and one ml. of the resulting suspension is transferred to each of five 250 ml. flasks containing 50 ml. of a medium consisting of:

Corn steep liquor—5 g./l. (grams per liter)
Peptone—20 g./l.
Dextrose—20 g./l.
Distilled $H_2O$—1 liter The flasks are incubated on a rotary shaker, 250 revolutions per minute (r.p.m.), 2 inches diameter of rotation, at 28° C. for 66 hours. Mycelial transfers, 6 percent, are made to eighteen 500 ml. flasks with 100 ml. each of the above medium. The flasks are shaken for 24 hours, and then supplemented with $dl$-13β-ethyl-18,19-dinorpregn-4-ene-3,11,20-trione. Forty milligrams (mg.) of the steroid dissolved in 2 ml. of ethanol are added to each flask. Incubation of the flasks is resumed and continued for a three day period.

The five ml. samples are extracted with one ml. of methyl-isobutyl-ketone, and aliquots of the extracts are spotted on No. 4 Whatman paper. Chromatography, carried out in a benzene/formamide system, discloses a single ultraviolet absorbing product more polar than the substrate.

The fermentation flasks are harvested at 72 hours. The pooled contents are filtered, and the mycelium is washed with a volume of warm water equal to 10 percent of the total volume. The filtrate and water wash are extracted five times with 500 ml. aliquots of ethyl acetate. The pooled extracts are washed with 500 ml. of water, dried over sodium sulfate ($Na_2SO_4$) and evaporated to dryness.

The residue is redissolved in ethyl acetate and placed at −10° C. overnight. Crystalline material, 255 mg. of $dl$-13β-ethyl - 21-hydroxy-18,19-dinopregn-4-ene-3,11,20-trione is obtained having a melting point (M.P.) of 190° C. The product has infrared absorption bands at 2.94 microns ($\mu$), 3.10$\mu$, 5.85$\mu$, 6.04$\mu$, 6.21$\mu$. The wavelength of maximum absorption in ultra-violet light occurs at 239 millimicrons (m$\mu$) in an ethanol solvent, that is $$\lambda_{max.}^{EtOH}\ 239\ m\mu$$

The extinction coefficient ($\epsilon$) is 15,450.

Evidence obtained by nuclear magnetic resonance (NMR) spectrography shows that the C-21 methylene proton appears as a singlet at δ 4.22 parts per million (p.p.m.) integrated for two protons and for the disappearance of the C-21 methyl group.

Based on the formula $C_{21}H_{28}O_4$, the elemental composition in terms of percent by weight is calculated to be C, 73.23; H, 8.19. An elemental analysis of the product compound is found to be C, 73.35; H, 8.14, percent by weight. This may be expressed:

$Analysis.$—Calculated for $C_{21}H_{28}O_4$ (percent): C, 73.23; H, 8.19. Found (percent): C, 75.35; H, 8.14.

Optical rotary dispersion analysis of a recrystallized sample (ethyl acetate/hexane) failed to show a resolution of the compound.

By a similar procedure various 21-hydroxy steroid products may be obtained by selecting appropriate starting compounds.

| Starting compound | Product |
|---|---|
| $dl$-13β-ethyl-18,19-dinorpregn-4-ene-3,20-dione. | $dl$-13β-ethyl-21-hydroxy-18,19-dinorpregn-4-ene-3,20-dione. |
| $dl$-13β-ethyl-11α-hydroxy-18,19-dinorpregn-4-ene-3,20-dione. | $dl$-13β-ethyl-11α,21-dihydroxy-18,19-dinorpregn-4-ene-3,20-dione. |
| $dl$-13β-ethyl-11β-hydroxy-18,19-dinorpregn-4-ene-3,20-dione. | $dl$-13β-ethyl-11β,21-dihydroxy-18,19-dinorpregn-4-ene-3,20-dione. |

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound having the formula:

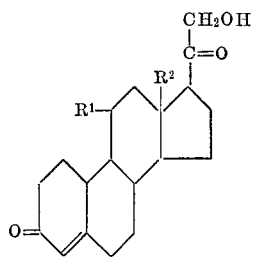

where $R^1$ is a member selected from the class consisting of oxo, α-hydroxy and β-hydroxy; and $R^2$ is an alkyl having from 2 to 3 carbons.

2. A compound as described in claim 1 which is: dl-13β-ethyl-21-hydroxy-18,19-dinorpregn - 4 - ene-3,11,20-trione.

3. A compound as described in claim 1 which is: dl-13β-ethyl - 11α,21 - dihydroxy-18,19-dinorpregn-4-ene-3,20-dione.

4. A compound as described in claim 1 which is: dl-13β-ethyl - 11β,21 - dihydroxy-18,19-dinorpregn-4-ene-3,20-dione.

References Cited

UNITED STATES PATENTS 2,166,877  7/1939  Reichstein _____ 260—397
2,861,085  11/1958  Djerassi et al. _____ 260—397.4

HENRY A. FRENCH, Primary Examiner

U.S. Cl. X.R.

195—51; 260—397.47, 999